May 1, 1956
E. H. SHAFF
2,743,636
DRIVE MECHANISM FOR PORTABLE POWER OPERATED
SCREW DRIVERS AND THE LIKE
Filed June 5, 1952
2 Sheets-Sheet 1
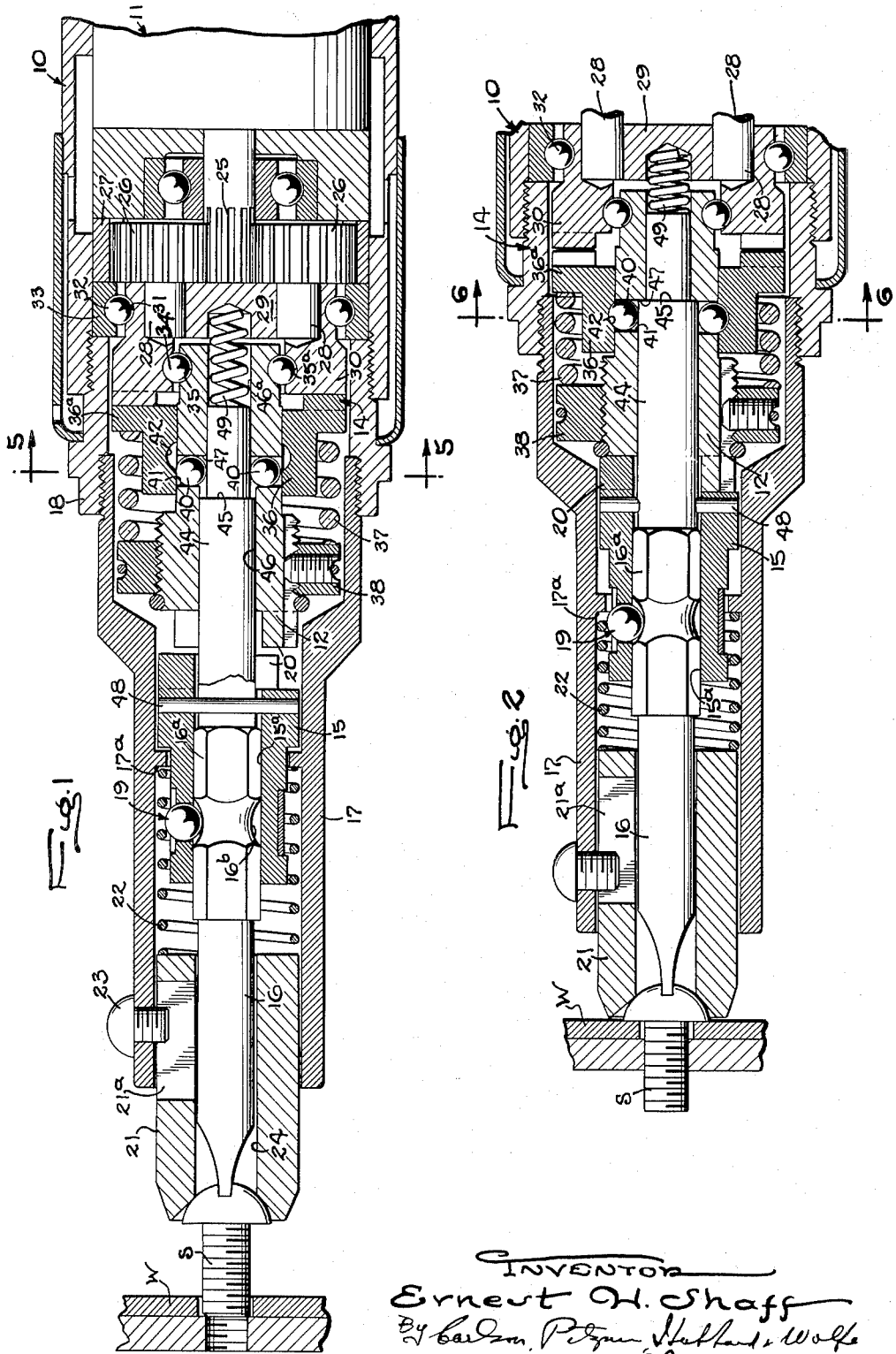
INVENTOR
Ernest H. Shaff
By Carlson, Pitzner, Hubbard & Wolfe
ATTORNEYS

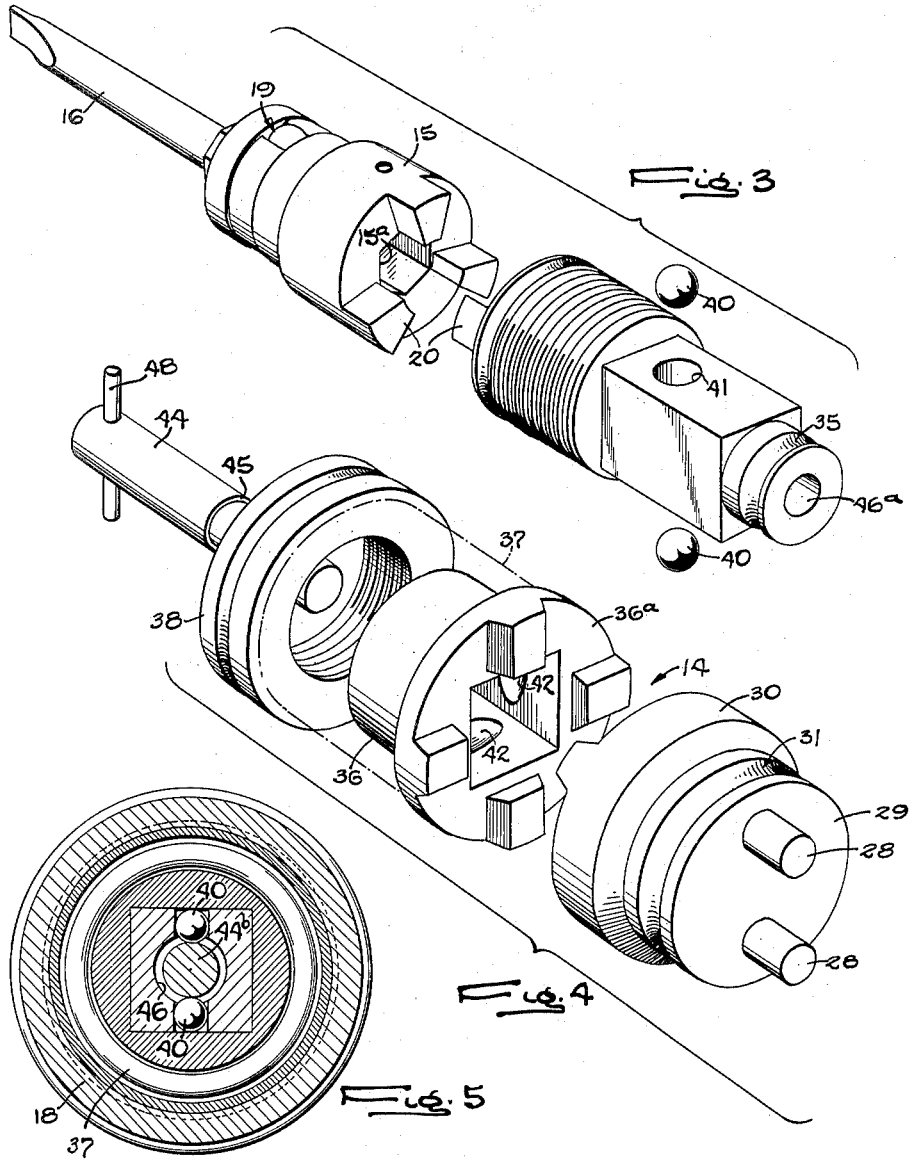

United States Patent Office 2,743,636
Patented May 1, 1956

2,743,636

DRIVE MECHANISM FOR PORTABLE POWER OPERATED SCREW DRIVERS AND THE LIKE

Ernest H. Shaff, Hamilton, Ind., assignor, by mesne assignments, to Gardner-Denver Company, a corporation of Delaware Application June 5, 1952, Serial No. 291,916

10 Claims. (Cl. 81—52.4)

The present invention relates generally to portable power driven tools such as screw drivers, nut runners and the like, and more particularly to drive mechanisms for such tools.

It is a general object of the invention to provide an improved clutch drive mechanism for tools of the foregoing general character which is operative to release when a screw or other threaded fastening element has been driven to a predetermined degree of tightness and to reset automatically upon interruption of the driving operation so as to be conditioned for a succeeding operation.

A more specific object lies in the provision of a clutch drive mechanism which is operative to prevent hammering action and is arranged to permit automatic clutch reengagement upon withdrawal of the tool from the driven fastening element.

The objects of the invention thus generally set forth together with other objects and ancillary advantages are attained by the construction and arrangement shown by way of illustration in the accompanying drawings, in which:

Figure 1 is a fragmentary longitudinal section through a tool embodying the features of the present invention and illustrating component relationship upon application of the tool to a threaded fastening element which is to be driven thereby.

Fig. 2 is a sectional view similar to Fig. 1 but illustrating component relationship after the fastening element has been driven.

Figs. 3 and 4 are fragmentary exploded perspective views of portions of a drive mechanism shown in the preceding figures.

Fig. 5 is a transverse section taken substantially in the plane of line 5—5 in Fig. 1.

Fig. 6 is a transverse section taken substantially in the plane of the line 6—6 in Fig. 2.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

As illustrated in the drawings, the exemplary form of the invention is shown embodied in a portable pneumatic screw driver comprising a generally cylindrical casing 10 having a rotary pneumatic motor 11 therein for driving a spindle 12 through the medium of a drive mechanism including a clutch indicated generally at 14. In the embodiment shown, the forward end of the spindle 12 is constructed for driving engagement with a bit holder 15, the latter being constructed and arranged to receive therein a bit 16.

The bit holder 15 is journaled within a generally cylindrical barrel 17 which is screw threaded into a collar 18 by means of which it is secured to the forward end of the main casing 10. The bit holder 15 has a coaxial bore 15a therethrough which is of hexagonal cross section for the reception of the similarly shaped shank 16a of the bit 16. Adjacent its forward end, the bit holder is equipped with a ball detent 19 which is adapted to engage in a peripheral groove 16b formed in the shank of the bit 16 adjacent the rear end thereof to retain the same within the bit holder.

The bit holder 15 is adapted to be drivingly connected to the spindle 12 upon application of the tool to a fastening element. For this purpose, the bit holder is axially slidable in the barrel 17 toward and away from the spindle, and the opposed faces of the bit holder and spindle are formed with interengaging teeth 20.

The barrel 17 is equipped at its forward end with a finder 21 which is telescopingly received therein, the same being biased outwardly by means of a spring 22 received within the barrel and operative between an internal shoulder 17a therein and the rear end of the finder. The finder 21 is constrained to axial movement with respect to the barrel by means of a screw 23 carried by the barrel and received in a longitudinal slot 21a formed in the finder. The finder 21 is provided with a coaxial bore 24 within which is journaled the forward end of the bit 16.

The driving connection between the motor 11 and the spindle 12 includes not only the clutch 14 but also speed reduction gearing. This speed reduction gearing is of the planetary type and includes a driving gear 25 rigid with the forward end of the shaft of the motor 11 which meshes with idler gears 26 rotatable within a fixed ring gear 27. The idler or planetary gears 26 are rotatable on stub shafts 28 carried by a spider 29 which in the present instance is formed integrally with the upper or driving element 30 of the clutch 14. This spider is formed with an external groove 31 which serves as the inner bearing race for antifriction bearing elements 32, the outer race for such bearing elements being formed by an internally grooved ring 33 which is held in place within the main casing between the inner end of the collar 18 and the ring gear 27.

To journal the inner end of the spindle 12 the same is provided with a peripheral groove 35 for the reception of antifriction bearing elements 34. The outer race for the bearing elements 34 is provided by an appropriate internal groove 35a formed within and adjacent the forward end of the driving clutch element 30.

The clutch 14 is of the overload-release or kickout type. In addition to the upper or driving clutch element 30, it includes a lower or driven clutch element 36. The latter is axially but non-rotatably mounted on the spindle 12 and is normally urged into engagement with the driving clutch element 30 by means of an expansion spring 37. The latter is disposed about the spindle 12 and is interposed between an outwardly extending flange 36a formed on the driven clutch element 36 and a tension adjusting nut 38 carried by the spindle adjacent the forward end thereof. The tension adjusting nut 38 serves to permit alteration of the point of release or disengagement between the driving and driven clutch elements 30 and 36, respectively, the clutch elements being formed on their opposed faces with interengaging teeth having conventionally tapered engaging faces.

An important feature of the present invention resides in the provision of means in the driving connection for the spindle 12 for maintaining the clutch 14 in disengaged condition upon initial kickout thereof when a screw or other fastening element has attained the degree of tightness as predetermined by the tensioning of the spring 37 and which means is operative to permit automatic reengagement of the clutch 14 upon interruption of the driving operation as by disengaging of the tool from the fastening element which has been driven.

In the present instance, the aforesaid means includes lockout elements and actuator means for moving the lockout elements into engagement with the disengaged clutch member to prevent re-engagement thereof with the other clutch member. As herein shown, the lockout elements are in the form of balls 40 which are carried in the opposite ends of a transverse passage 41 located intermediate the ends of the spindle 12. The balls 40 are adapted to be urged outwardly in the passage 41 for engagement in oppositely disposed recesses 42 formed interiorly of the lower or driven clutch element 36. The recesses 42 are normally disposed in non-registering relation with respect to the passage 41 and are moved into registry therewith upon forward axial movement of the driven clutch element 36 in response to disengagement of the clutch 14 when the predetermined degree of tightness of the driven fastening element obtains.

In the illustrative tool, the actuator means for the lockout elements includes a member engageable with the balls 40 and shiftable axially of the tool between locking and unlocking positions with respect to the balls. As shown, this member comprises a coaxially disposed push rod 44. The push rod has an enlarged forward end portion 44a and a reduced rear end portion 44b defining an outwardly extending peripheral shoulder 45 intermediate the ends of the rod. The spindle 12 is provided with a stepped coaxial bore 46 for the reception of the push rod 44, the portions of which correspond in diameter to those of the push rod and within which the push rod is axially shiftable. The rear end portion of the spindle bore which is of reduced diameter terminates at the rear edge of the transverse spindle passage 41 and there defines an internally projecting shoulder 47.

The forward end of the push rod 44 is received in the rear end of the bit holder bore 15a and is fixed to the bit holder 15 by means of a through-pin 48 received in registering passages in the mating ends of the bit holder and push rod.

The actuator means for the lockout elements, herein the balls 40, is arranged to permit resetting of the clutch automatically upon interruption of the driving operation. Thus the actuator member 44 for the balls 40 is normally biased for movement into its unlocking position. In the illustrative tool this is effected by a compression type return spring 49 received in the rear end of the spindle bore 46a and interposed between the rear end of the push rod 44 and the driving clutch element 30. The spring 49 serves to normally urge the push rod and the bit holder outwardly.

Upon application of the tool to a fastening element such as the screw S, preparatory to driving the same into a workpiece W, the tool is pressed forwardly. This causes rearward movement of the finder 21 with respect to the barrel 17, engagement of the blade portion of the bit 16 with the screw kerf, and rearward movement of the bit 16 and the bit holder 15 with respect to the spindle 12 to the end that partial engagement of the toothed connection 20 is effected. This rearward movement of the bit holder 15 also results in rearward movement of the push rod 44 so that the outwardly extending shoulder 45 thereon engages the lockout balls 40, which engagement is effected inwardly of the centers of the balls. Therefore, as long as the tool is pressed into engagement with the work, a force is maintained urging the lockout balls outwardly in the spindle passage 41. However, until the screw S has been driven into the workpiece W, upon application of power to the tool, and the desired degree of tightness thereof obtains, the lockout balls cannot move outwardly in the spindle passage 41 since, with the clutch 14 engaged, the ball-receiving recesses 42 in the driven clutch element 36 are out of registry therewith.

When the predetermined degree of tightness of the screw S obtains, the teeth of the driving clutch element 30 override those of the driven clutch element 36 and force the driven clutch element outwardly against the action of the spring 37. Thus the ball receiving recesses 42 are moved into registry with the transverse spindle passage 41 and the shoulder 45 of the push rod 44 can then force the balls outwardly into the recesses in the driven clutch element.

Upon such movement of the lockout balls into engagement with the recesses 42 in the lower clutch block, the shoulder 45 can move past the balls and into engagement with the internal shoulder 47 in the spindle 12. This movement brings the enlarged forward end portion of the push rod 44 behind the balls 40 so as to hold them outwardly in engagement with the recesses 42. Thus the driven clutch element 36 is locked out of engagement with the driving clutch element 30 and the clutch 14 is maintained in released or disengaged condition so long as forward pressure on the tool holding the same in engagement with the screw S is maintained.

Rearward movement of the push rod 44 also serves to compress the spring 49 which is interposed between the rear end of the push rod and the driving clutch block 30. It will be apparent, therefore, that upon release of forward pressure on the tool, as in removing the same from the driven screw S, the spring 49 is permitted to expand forcing the push rod and with it the bit holder and the bit forwardly within the spindle and barrel, respectively, to return the same to the positions thereof illustrated in Fig. 1. Such forward movement of the push rod brings the rear end portion of the push rod, which is of reduced diameter, into position behind the balls and permits the driven clutch element 36, under the action of the clutch spring 37, to cam the lockout balls 40 inwardly thereby releasing the driven clutch element 36 for re-engagement with the driving clutch element 30. It is thus apparent that the tool is automatically re-set or conditioned for subsequent operation.

It will be apparent from the foregoing that a tool constructed in accordance with the present invention is effective not only to run a fastening element to a predeterminable degree of tightness, but also effectually prevents overdriving of the fastening element. Attendant to such operation are numerous advantages including reduction of wear on components of the device and of the likelihood of damaging the fastening element through elimination of hammering action between the clutch elements.

I claim as my invention:

1. In a tool for driving a fastening element, a drive mechanism comprising, in combination, a spindle, a kickout type clutch having normally engaged driving and driven clutch elements, one of said clutch elements being constrained to axial movement upon said spindle, lockout means including a member carried by said spindle and movable in a generally radial direction with respect thereto for engagement with said one clutch element upon initial disengagement of said clutch, and an actuator for said lockout means supported for relative axial movement into and out of holding relation to said member, said actuator being operative upon disengagement of said clutch to move said member into locking engagement with said one clutch element to prevent re-engagement of said clutch, said actuator being normally biased for movement into non-holding relation to said member.

2. In a tool for driving a fastening element, a drive mechanism comprising, in combination, a spindle, a kickout type clutch having normally engaged driving and driven clutch elements, one of said clutch elements being constrained to axial movement upon said spindle, lockout means including a member carried by said spindle and movable in a generally radial direction with respect thereto for engagement with said one clutch element upon initial disengagement of said clutch, and an actuator for said lockout means supported for relative axial movement with respect to said spindle in response to the reaction force exerted by the fastening element upon pressing the tool into engagement therewith and operative upon disengagement of said clutch for effecting engagement of said member with said one clutch element to prevent reengagement of said clutch.

3. In a power actuated tool for driving a threaded fastening element, a drive mechanism comprising, in combination, a spindle, a kickout type clutch including a driving element and a driven element and means normally biasing said driven element into engagement with said driving element, said driven clutch element being axially but non-rotatably movable on said spindle, lockout means interposed between said spindle and said driven clutch element for maintaining said clutch released upon initial disengagement thereof, and means carried by said spindle and responsive to the reaction force exerted thereon by the fastening element when the tool is pressed into engagement therewith for actuating said lockout means upon disengagement of said clutch.

4. In a power actuated tool for driving a threaded fastening element, a drive mechanism comprising, in combination, a spindle, a kickout type clutch including a driving element and a driven element and a spring normally biasing said driven element into engagement with said driving element, said driven clutch element being axially but non-rotatably movable on said spindle, lockout means interposed between said spindle and said driven clutch element for maintaining said clutch released upon initial disengagement thereof, an actuator carried by said spindle and movable in response to the reaction force exerted thereon by the fastening element when the tool is pressed into engagement therewith for operating said lockout means upon disengagement of said clutch, and a return spring conditioned by said actuator upon operation of said lockout means and operative to restore said actuator to its normal position when the reaction force is relieved so as to permit re-engagement of said clutch.

5. In a power actuated tool for driving a threaded fastening element, a drive mechanism comprising, in combination, a spindle having an axial bore therein and a passage intersecting said bore intermediate the ends thereof, a kickout type clutch including a driving element and a driven element normally biased into engagement with said driving element, said driven clutch element being axially but non-rotatably movable on said spindle and having a recess therein normally disposed in non-registering relation to said spindle passage, a ball received in said spindle passage, and a push rod axially shiftable in said spindle bore into engagement with said ball in response to the reaction force exerted thereon by the fastening element when the tool is pressed into engagement with the fastening element to urge the ball outwardly in said spindle passage, said ball being engageable in said recess in the driving clutch element upon registration of said recess with said spindle passage in response to disengagement of said clutch when the predetermined degree of tightness of the fastening element obtains so as to maintain said clutch in disengaged condition.

6. In a power actuated tool for driving a threaded fastening element, a drive mechanism comprising, in combination, a spindle having an axial bore therein and a passage intersecting said bore intermediate the ends thereof, a kickout type clutch including a driving element and a driven element and a spring normally biasing the driven element into engagement with said driving element, said driven clutch element being axially but non-rotatbly movable on said spindle and having a recess therein normally disposed in non-registering relation to said spindle passage, a ball received in said spindle passage, and a push rod axially shiftable in said spindle bore and having enlarged and reduced portions defining a shoulder intermediate its ends engageable with said ball in response to reaction force exerted thereon by the fastening element when the tool is pressed into engagement therewith to urge the ball outwardly in said spindle passage, said ball being engageable in the recess in said driving clutch element when registration of said recess with said spindle passage obtains upon disengagement of said clutch in response to attainment of the predetermined degree of tightness of the fastening element, the enlarged portion of said push rod being moved across said spindle passage to hold said ball in recess-engaging position so as to maintain said clutch in disengaged condition.

7. In a power actuated tool for driving a threaded fastening element, a drive mechanism comprising, in combination, a spindle having an axial bore therein and a passage intersecting said bore intermediate the ends thereof, a kickout type clutch including a driving element and a driven element and a spring normally biasing the driven element into engagement with said driving element, said driven clutch element being axially but non-rotatably movable on said spindle and having a recess therein normally disposed in non-registering relation to said spindle passage, a ball received in said spindle passage, and a push rod axially shiftable rearwardly in said spindle bore and having enlarged and reduced portions defining a shoulder intermediate its ends engageable with said ball in response to reaction force exerted thereon by the fastening element when the tool is pressed into engagement therewith to urge the ball outwardly in said spindle passage, said ball being engageable in the recess in said driven clutch element when registration of said recess with said spindle passage obtains upon disengagement of said clutch in response to attainment of the predetermined degree of tightness of the fastening element, the enlarged portion of said push rod being moved across said spindle passage to hold said ball in recess-engaging position so as to maintain said clutch in disengaged condition, and a spring in said spindle bore engaging said rod and adapted to be compressed upon rearward movement of said rod, said spring effecting forward movement of said rod upon relaxing the force pressing the tool against the fastening element to release said ball and thereby permit re-engagement of said clutch.

8. In a power actuated tool for driving a threaded fastening element, a drive mechanism comprising, in combination, a spindle, a kick-out type clutch including driving and driven elements, one of said elements being axially but non-rotatably movable with respect to said spindle, means normally biasing said one clutch element into engagement with the other clutch element, lockout means interposed between said spindle and said one clutch element for maintaining said clutch released upon initial disengagement thereof, and means responsive to the reaction force exerted thereon by the fastening element when the tool is pressed into engagement therewith for actuating said lockout means upon disengagement of said clutch.

9. In a power actuated tool for driving a threaded fastening element, a drive mechanism comprising, in combination, a spindle, a kick-out type clutch including driving and driven elements, one of said elements being axially but non-rotatably movable with respect to said spindle, means normally biasing said one clutch element into engagement with the other clutch element, lockout means interposed between said spindle and said one clutch element for maintaining said clutch release upon initial disengagement thereof, and an actuator for said lockout means normally biased into inactive position and operative as an incident to disengagement of said clutch to render the lockout means effective.

10. In a power actuated tool for driving a threaded fastening element, a drive mechanism comprising, in combination, a spindle, a kick-out type clutch including driving and driven elements, one of said elements being axially but non-rotatably movable with respect to said spindle, means normally biasing said one clutch element into engagement with the other clutch element, lockout means interposed between said spindle and said one clutch element for maintaining said clutch release upon initial disengagement thereof, and means including an axially shiftable member normally biased into inactive position and operative as an incident to disengagement of said clutch to render said lockout means effective.

References Cited in the file of this patent

UNITED STATES PATENTS

| | | |
|---|---|---|
| 1,725,562 | Borchert | Aug. 20, 1929 |
| 2,263,709 | Van Sittert | Nov. 25, 1941 |
| 2,475,518 | Ristow | July 5, 1949 |
| 2,600,327 | Ridge | June 10, 1952 |
| 2,634,640 | Pedersen | Apr. 14, 1953 |